(12) United States Patent
Tsirkin

(10) Patent No.: US 12,124,866 B2
(45) Date of Patent: Oct. 22, 2024

(54) FAST VIRTUAL MACHINE RESUME AT HOST UPGRADE

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 606 days.

(21) Appl. No.: 17/082,701

(22) Filed: Oct. 28, 2020

(65) Prior Publication Data
US 2022/0129292 A1   Apr. 28, 2022

(51) Int. Cl.
G06F 9/455   (2018.01)
G06F 11/14   (2006.01)
G06F 11/20   (2006.01)

(52) U.S. Cl.
CPC ...... *G06F 9/45558* (2013.01); *G06F 11/1402* (2013.01); *G06F 11/2017* (2013.01); *G06F 2009/45575* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,006,079 B2 | 8/2011 | Goodson et al. | |
| 8,635,395 B2 | 1/2014 | Colbert | |
| 9,110,762 B2 | 8/2015 | Russinovich et al. | |
| 9,329,947 B2 | 5/2016 | Elyashev et al. | |
| 9,727,368 B1* | 8/2017 | Tsirkin | G06F 3/067 |
| 10,007,540 B2 | 6/2018 | Usgaonkar et al. | |
| 10,496,424 B2 | 12/2019 | Shah | |
| 11,068,299 B1* | 7/2021 | Armangau | G06F 3/0688 |
| 2014/0164722 A1* | 6/2014 | Garthwaite | G06F 11/1438 711/162 |
| 2015/0178097 A1* | 6/2015 | Russinovich | G06F 8/656 713/2 |
| 2021/0064408 A1* | 3/2021 | Gill | G06F 9/45533 |
| 2021/0225096 A1* | 7/2021 | Dong | G06F 9/45558 |
| 2021/0406050 A1* | 12/2021 | Huang | G06F 12/109 |

OTHER PUBLICATIONS

Chen, Zhenghua; WO2021047425—Virtualization Method and System for Persistent Memory; https://patentscope.wipo.int/search/en/detail.jsf?docId=WO2021047425&_cid=P10-LN97S6-55010-1 (Year: 2020).*
David Davis; "Solving the Five Most Common VMware Virtual Machine Issues"; ActualTech Media; Published Jan. 2015; pp. 1-20.

* cited by examiner

*Primary Examiner* — Wynuel S Aquino
(74) *Attorney, Agent, or Firm* — Kilpatrick Townsend & Stockton LLP

(57) ABSTRACT

A system includes at least one memory including a persistent storage, at least one processor in communication with the at least one memory, a virtual machine associated with a virtual machine memory, and a hypervisor executing on the at least one processor. The hypervisor is configured to map the virtual machine memory to the persistent storage, detect a request to restart a host, and synchronize the virtual machine memory by copying data to the persistent storage for each page of the virtual machine memory that has changed. The hypervisor is also configured to pause the virtual machine prior to the host restarting, save a virtual machine state to the persistent storage, restore the virtual machine state after the host restarts, and resume operation of the virtual machine.

20 Claims, 7 Drawing Sheets

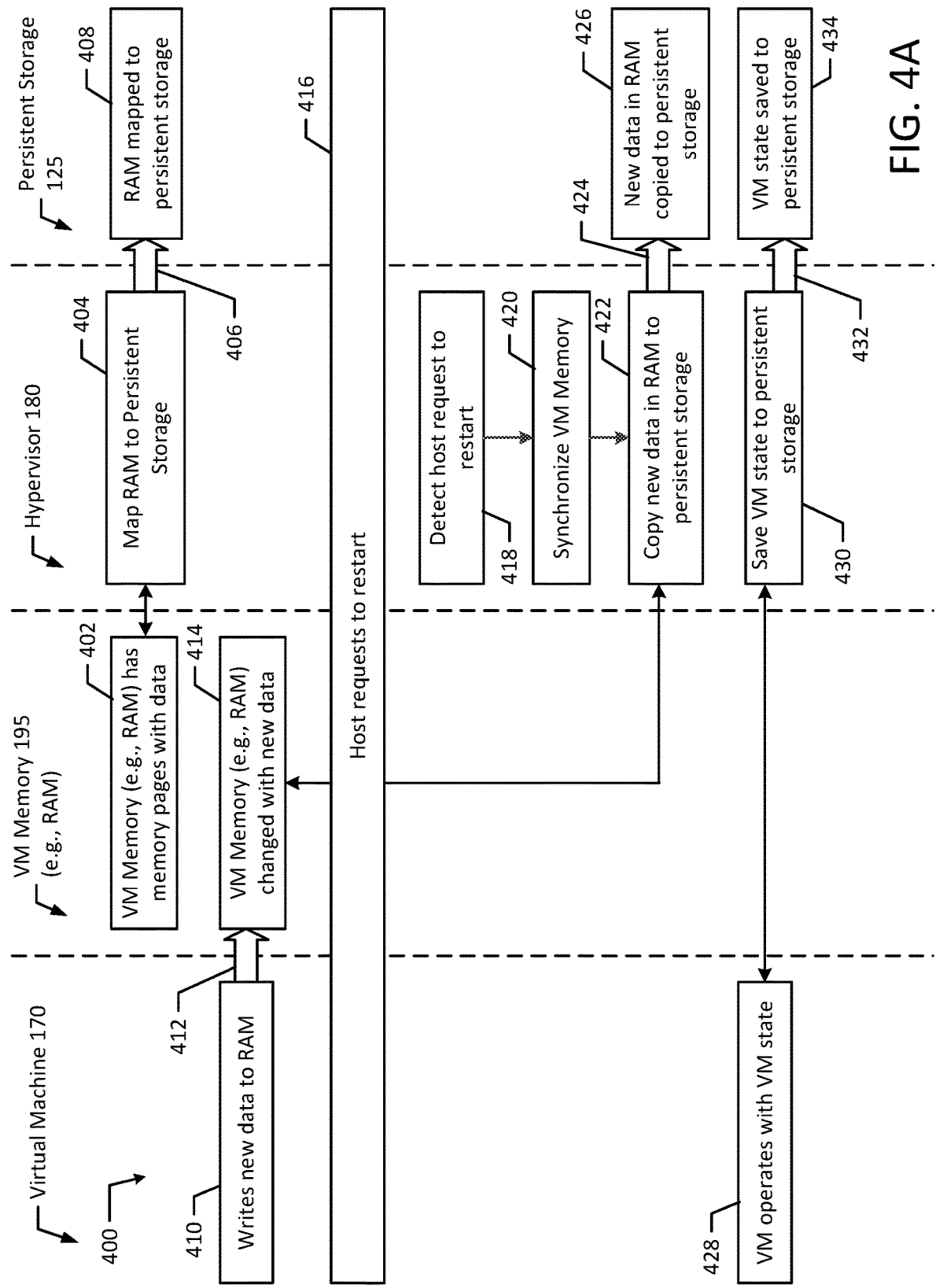

FAST VIRTUAL MACHINE RESUME AT HOST UPGRADE

BACKGROUND

In-place software upgrades of hosts and other components, such as quick emulators ("QEMUs") may be performed by live migrating virtual machines to a new host or an upgraded host. Live migration refers to the process of moving a running virtual machine or application between different physical machines (e.g., hosts) without disconnecting the client or application. Memory, storage, and network connectivity of the virtual machine are transferred from the original guest machine to the destination. In some instances, the virtual machine memory may be stored on a separate persistent memory card with its own power source enabling the virtual machine memory to persist during migration processes in the event of the host crashing.

SUMMARY

The present disclosure provides new and innovative systems and methods for quickly resuming a virtual machine at host upgrade. In an example, a system includes at least one memory including a persistent storage, at least one processor in communication with the at least one memory, a virtual machine associated with a virtual machine memory, and a hypervisor executing on the at least one processor. The hypervisor is configured to map the virtual machine memory to the persistent storage, detect a request to restart a host, and synchronize the virtual machine memory by copying data to the persistent storage for each page of the virtual machine memory that has changed. The hypervisor is also configured to pause the virtual machine prior to the host restarting, save a virtual machine state to the persistent storage, restore the virtual machine state after the host restarts, and resume operation of the virtual machine.

In an example, a method includes mapping, by a hypervisor, a virtual machine memory associated with a virtual machine to a persistent storage. The hypervisor is also configured to detect a request to restart a host and synchronize the virtual machine memory by copying data to the persistent storage for each page of the virtual machine memory that has changed. Prior to the host restarting, the hypervisor is configured to pause the virtual machine. Additionally, the hypervisor is configured to save a virtual machine state to the persistent storage and restore the virtual machine state after the host restarts. The hypervisor is also configured to resume operation of the virtual machine.

In an example, a non-transitory machine readable medium stores code, which when executed by at least one processor is configured to map a virtual machine memory associated with a virtual machine to a persistent storage, detect a request to restart a host, and synchronize the virtual machine memory by copying data to the persistent storage for each page of the virtual machine memory that has changed. The non-transitory machine readable medium is also configured to pause the virtual machine prior to the host restarting, save a virtual machine state to the persistent storage, restore the virtual machine state after the host restarts, and resume operation of the virtual machine.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 4A and 4B illustrate a flow diagram of an example process for resuming operation of a virtual machine after a host restart according to an example embodiment of the present disclosure.

DETAILED DESCRIPTION OF EXAMPLE EMBODIMENTS

Figure 1:
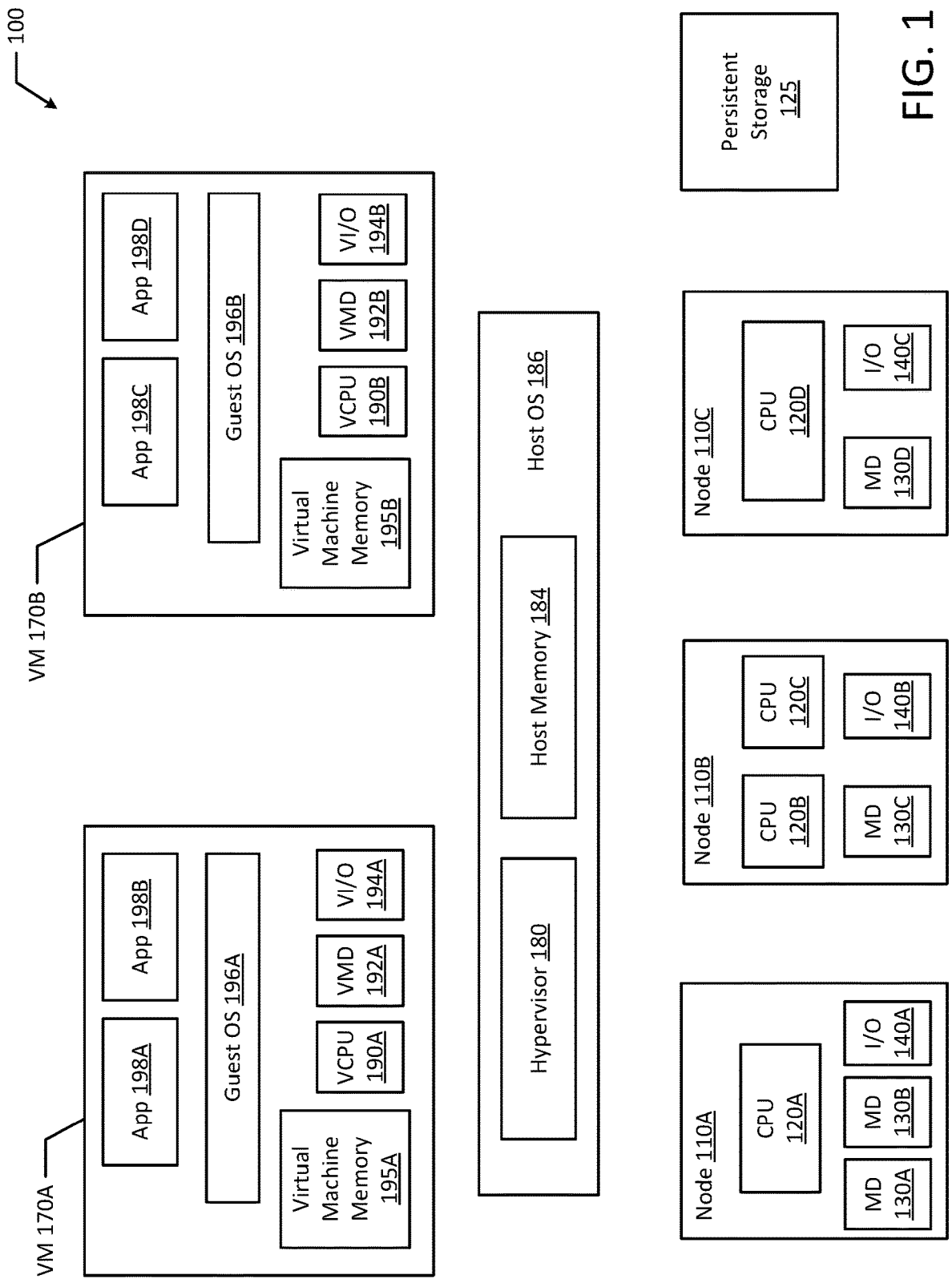
FIG. 1 illustrates a block diagram of an example computer system according to an example embodiment of the present disclosure.

Techniques are disclosed for quickly resuming virtual machines ("VMs") during host upgrades or host restarts. Typically, to perform an in-place software upgrade of a host and associated components, such as quick emulators ("QEMUs"), a live migration is performed. Live migration refers to the process of moving a running virtual machine or application between different physical machines (e.g., hosts) without disconnecting the client or application. However, live migration of VMs may take a long time and may be computationally expensive, which may be problematic if a host needs to be upgraded regularly or restarted quickly.

Virtual machine memory may be stored on a separate persistent memory card, with its own power source, such that the virtual machine memory persists during the host upgrade and live migration process. The persistent memory with its secondary power source (e.g., battery powered) also ensures that the VM is not restarted as the host restarts during the upgrade or during a host crash.

To allow host restarts without VM restarts, and without the need of specialized hardware (e.g., persistent storage with its own power source), the hypervisor is modified to map all of the VM memory to persistent storage (e.g., disk). For example, on Linux, the hypervisor may map VM memory to disk with a "mmap" command on a file on disk and then use the resulting virtual memory as VM memory. Additionally, when detecting a request to restart the host, the hypervisor iterates over VM memory, and for each page the VM has changed (e.g., that differs between storage and memory), the hypervisor copies the data out to the mapped persistent storage. Before the host restarts, the hypervisor stops the VM and saves the VM state to persistent storage.

Then, after the host restarts, the hypervisor restores the VM state and resumes the VM. Once the VM is resumed, the VM memory is restored. For example, as the VM accesses each page, the hypervisor restores the VM memory using the mapping (e.g., copying data to RAM from persistent storage). Host upgrades typically require a host restart, which often requires either restarting the virtual machines running on the host or migrating the virtual machines to another host while the upgrades to the host occur. However, the systems and methods disclosed herein allow hosts to restart without VM restarts by synchronizing the virtual machine memory to persistent storage. Additionally, the systems and methods disclosed herein achieve persistence without a separate persistent memory card that has its own power source. For example, upgrades that cause the host and associated VMs to restart (or migrate) may use a separate persistent memory card with its own power source to ensure the virtual machine memory persists after the host restart. Instead of using a persistent memory card with its own power source, the systems and methods disclosed herein advantageously maintain persistence by synchronizing the memory with disk, thereby supporting the functionality of persistence without the need for special hardware. Specifically, the systems and method disclosed herein advantageously improve uptime for VMs running on hosts that require restarts without the need for migration or special hardware.

FIG. 1 depicts a high-level component diagram of an example computing system 100 in accordance with one or more aspects of the present disclosure. The computing system 100 may include an operating system (e.g., host OS 186), one or more trusted execution environments ("TEEs") (e.g., virtual machines 170A-B), a hypervisor 180, nodes (e.g., nodes 110A-C), and persistent storage 125.

Virtual machines 170A-B may include a guest OS, guest memory, a virtual CPU (VCPU), virtual memory devices (VMD), and virtual input/output devices (VI/O). For example, virtual machine 170A may include guest OS 196A, guest memory or virtual machine memory 195A, a virtual CPU 190A, a virtual memory devices 192A, and virtual input/output device 194A. Virtual machine memory 195A may include one or more memory pages. Similarly, virtual machine 170B may include guest OS 196B, virtual machine memory 195B, a virtual CPU 190B, a virtual memory devices 192B, and virtual input/output device 194B. Virtual machine memory 195B may include one or more memory pages.

In an example, the computing system 100 may include a hypervisor 180 and host memory 184. Hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

A virtual machine 170A may execute a guest operating system 196A and run applications 198A-B which may utilize the underlying VCPU 190A, VMD 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186A. In an example, a device may be implemented as a virtual machine (e.g., virtual machine 170A-B).

The hypervisor 180 is configured to allow host restarts or upgrades without restarting the VMs 170. As used herein, the "host" may generally refer to the host OS 186 or the physical host machines, such as nodes 110A-C. For example, the hypervisor 180 is modified to map the VM memory to persistent storage 125 (e.g., disk). When detecting a request to restart a host (e.g., host OS 186), the hypervisor 180 iterates over virtual machine memory (e.g., virtual machine memory 195A-B, hereinafter referred to generally as virtual machine memory 195), and for each memory page that the virtual machine (e.g., virtual machine 170A-B, hereinafter referred to generally as virtual machine 170) has changed since the initial mapping, the hypervisor 180 copies the data from the memory page to the persistent storage 125.

Just before the host restarts, the hypervisor 180 pauses the virtual machine 170 and saves a VM state to the persistent storage 125. After the host restarts, the hypervisor 180 restores the VM state and resumes the virtual machine 170. In an example, the VM state may include an identifier associated with the VM or the underlying system (e.g., a hardware ID, a firmware ID, a vendor ID). The VM state may also include version information. Additionally, the VM state may include a list of running applications, loaded firmware, memory size, etc. In another example, the VM state may include a hash function of information associated with the virtual machine.

Furthermore, the virtual machines may have various states, such as "starting", "running", "stopping", "stopped", "suspended", "paused", "aborted", "stuck", etc. The VM state may also relate to the operational state of the virtual machine 170. For example, the virtual machine 170 may be set to the starting state after the virtual machine is started or restarted, e.g., after a VMSTART or VMRESTART operation. The virtual machine 170 may be in a running state after the virtual machine 170 is hosted and sends a virtual machine manager, such as a hypervisor 180, a notification that the virtual machine 170 has started. In another example, the hypervisor 180 may determine and set virtual machine states through a discovery process.

When an attempt is made by the hypervisor 180 to stop, restart or suspend the virtual machine 170, the virtual machine state may be set to "stopping." In an example, the hypervisor 180 immediately sets the virtual machine to the stopping state when attempting to stop, restart or suspend the virtual machine 170. The virtual machine 170 may have a stopped state when the virtual machine is shutdown, which may be from a stop or kill instruction from the hypervisor 180 or from a shutdown initiated by the virtual machine 170 itself.

Once the virtual machine 170 is resumed, the VM state and the virtual machine memory is restored. The VM state may be restored prior to the virtual machine 170 resuming (e.g., changing from a paused state to a resumed or running state). In an example, the memory may be restored lazily. For example, as the virtual machine 170 accesses each page, the hypervisor 170 restores each page of VM memory 195 using the mapping (e.g., mapping between persistent storage 125 and virtual machine memory 195) and data from each page is copied from persistent storage 125 to VM memory 195 (e.g., RAM).

The persistent storage 125 may be magnetic storage that uses different patterns of magnetization in a magnetizable material to store data. In another example, persistent storage 125 may be an electronic non-volatile memory storage medium or chip, such as flash memory. The persistent storage 125 may also be a non-volatile dual in-line memory module ("NVDIMM"). The NVDIMM may be a type of random-access memory that is non-volatile, such that the NVDIMM retains its contents even when electrical power is removed. Additionally, the NVDIMM may improve application performance and system crash recovery time. Conversely, some examples of memory that would be unsuitable for the persistent storage 125 are dynamic random-access memory ("DRAM") and synchronous dynamic random-access memory ("SDRAM"). SDRAM may be any form of DRAM where the operation of its external pin interface is coordinated by an externally supplied clock signal. DRAM may typically take the form of an integrated circuit chip. Unlike flash memory, DRAM is volatile memory, since it loses its data quickly when power is removed.

As discussed herein, the hypervisor 180 may be modified to map virtual machine memory 195 to persistent storage 125 to ensure that mapped memory (e.g., stored data) is durable or persistent (e.g. the data survives host restarts). In an example, the persistent storage 125 may be disk storage. Additionally, the persistent storage 125 may be associated with one or more memory devices (e.g., MD 130A-D) of nodes 110A-C. The hypervisor 180, or associated processors 120, may interface and access the persistent storage 125 through a host bus adapter over a peripheral interconnect (e.g., PCI). In an example, the persistent storage 125 is adapted to persist across a power cycle, a power failure or both. Additionally, the persistent storage 125 is configured to persist without a battery (e.g., the persistent storage 125 may persist without specialized hardware requiring a secondary power source). In an example, the persistent storage 125 is configured to persist post-restart of the host, such that when the host restarts, the data stored in persistent storage 125 is retained. An example of specialized hardware requiring a secondary power source may be non-volatile random-access memory ("NVRAM"). One example of NVRAM is located on a computer motherboard that is battery-backed and that uses a complementary metal-oxide-semiconductor ("CMOS") battery to charge and store data.

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

Figure 2A:
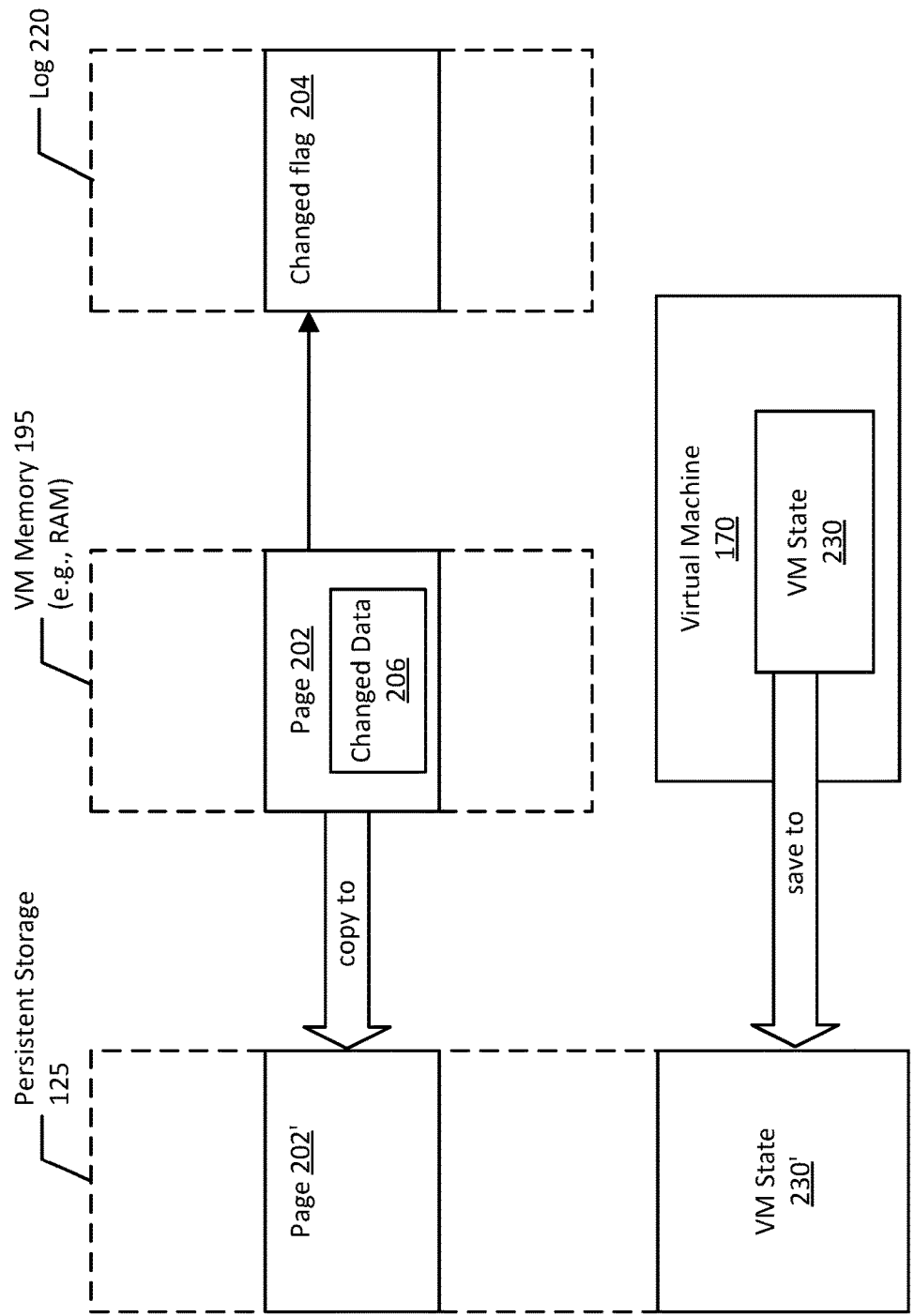
FIGS. 2A and 2B illustrate block diagrams of a virtual machine before and after host restart according to an example embodiment of the present disclosure.
Figure 2B:
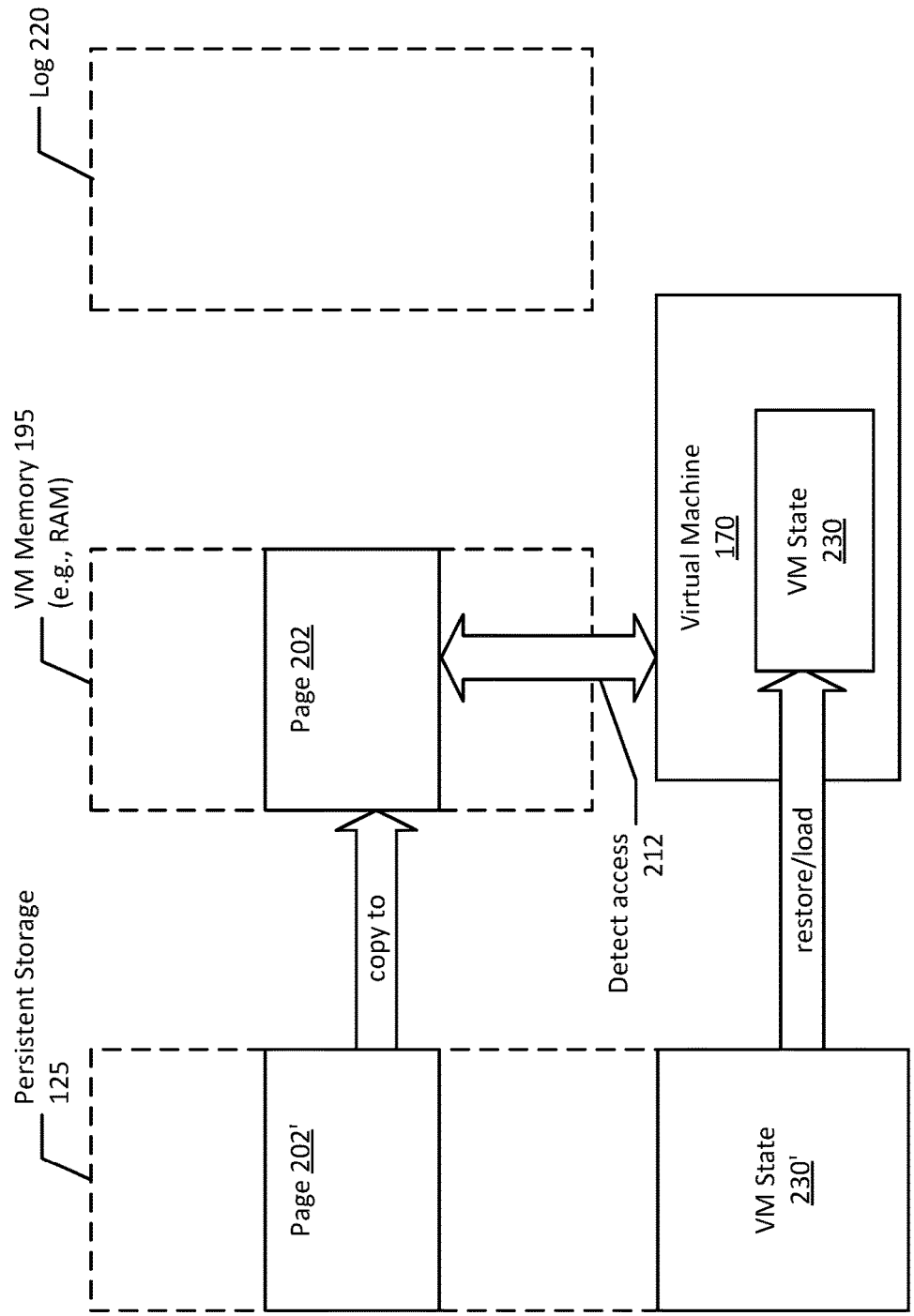

FIGS. 2A and 2B illustrate block diagrams of a virtual machine 170 before and after a host restart (e.g., upon a host upgrade). As illustrated in FIG. 2A, prior to a host restart, the virtual machine memory 195 is mapped to persistent storage 125. After a request to restart a host is detected, the virtual machine memory is synchronized by copying data to the persistent storage 125 for each memory page (e.g., memory page 202) of VM memory 195 that has changed since the virtual machine memory 195 was mapped to persistent storage 125. For example, memory page 202 may be copied to persistent storage (illustrated as memory page 202'). The memory pages 202 that are copied to persistent storage 125 are pages that include changed data 206, which may be indicated by a changed flag 204 in log 220. Changed flag 204 may be set for any data or memory pages 202 that are updated after the initial mapping between virtual machine memory 195 and persistent storage 125 occurs. Alternatively, the changed flag 204 (e.g., a "dirty" flag) may be set on each changed memory page by the hypervisor 180 after the request to restart the host is detected. The changed flags 204 may also be set periodically, at predetermined intervals after the initial mapping, such that the mapping is updated routinely. For example, the hypervisor 180 may set the changed flag 204 on each memory page 202 that has changed since the initial mapping between the virtual machine memory 195 and the persistent storage 125. In another example, the changed data 206 within the memory page may be copied over to persistent storage 125, instead of copying the entire memory page, which may reduce synchronization times.

For example, the hypervisor 180 may check whether the flag 204 (e.g., a "dirty" flag) exists for each memory page 202 in page-cache or within log 220. The page-cache may be part of the virtual machine memory 195. Then, the virtual machine 170 is paused prior to the host restarting and a VM state 230 of the virtual machine 170 is saved to the persistent storage (illustrated as VM state 230').

Continuing on FIG. 2B, after the host restarts, the VM state 230 is restored to the virtual machine 170. Once the VM state 230 is restored, operation of the virtual machine 170 may be resumed. Then, the VM memory 195 is restored. For example, as the VM 170 accesses each page (e.g., page 202), the hypervisor may detect the access 212 and may restore the VM memory 195. For example, the pages that were previously mapped and copied to persistent storage 125 are copied back to RAM. By synchronizing virtual machine memory 195 (e.g., RAM) and the persistent storage 125 (e.g., disk) with the hypervisor 180, persistence functionality is maintained, which allows host upgrades without the need for (i) special hardware (e.g., a separate persistent memory card with its own power source) or (ii) live migration of the virtual machine(s) 170. Specifically, the host may be upgraded without restarting the virtual machine or performing a time consuming and resource-expensive live migration, which ultimately improves uptime for virtual machines 170.

Figure 3:
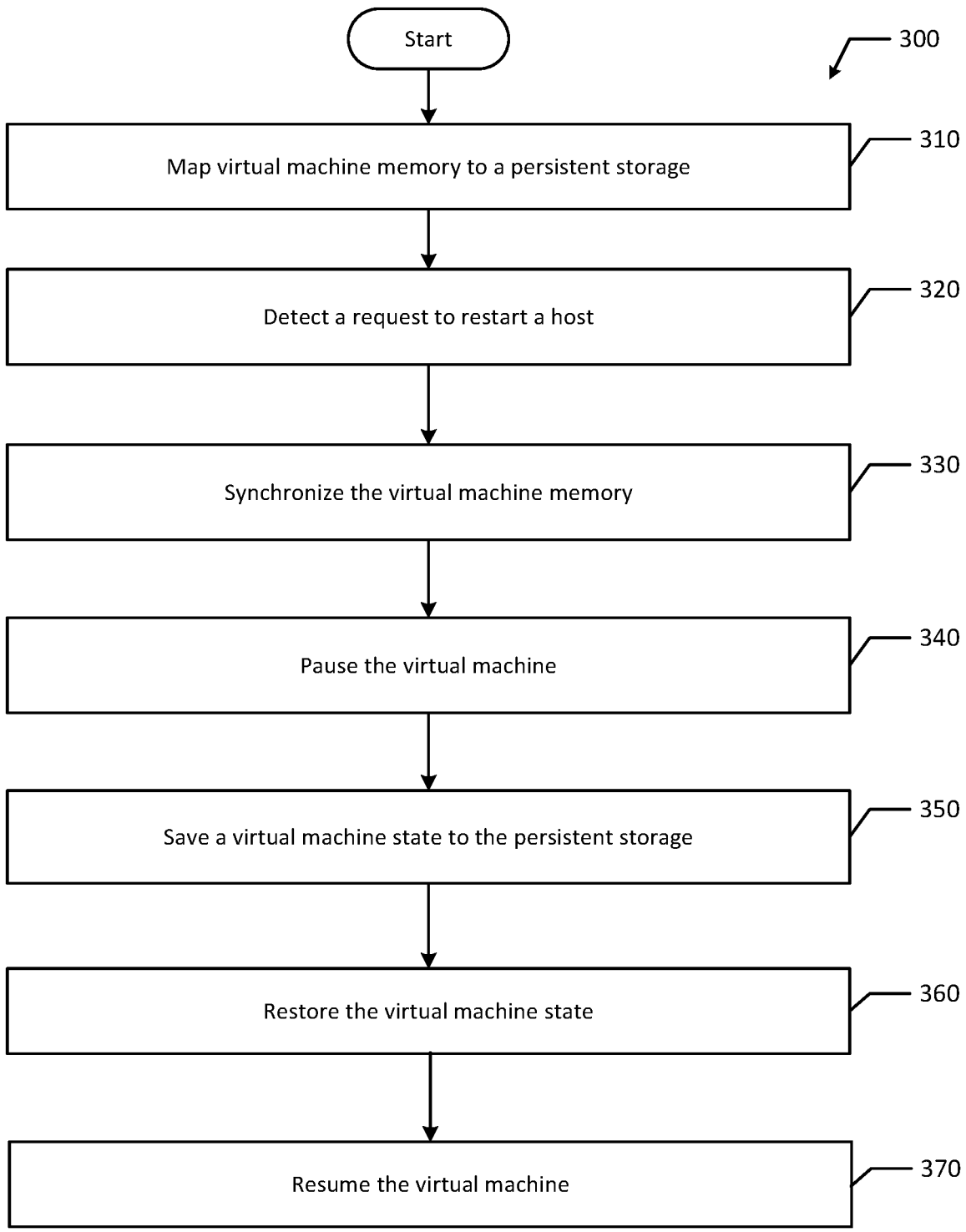
FIG. 3 illustrates a flowchart of an example process for resuming a virtual machine after a host restart according to an example embodiment of the present disclosure.

FIG. 3 illustrates a flowchart of an example method 300 for resuming a virtual machine 170 after a host restart in accordance with an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

In the illustrated example, method 300 includes mapping virtual machine memory to a persistent storage (block 310). For example, a hypervisor 180 may map a virtual machine memory 195 associated with a virtual machine 170 to a persistent storage 125. The mapping may be accomplish with a page table, such as a host page table, which is a data structure that may be used to store a mapping of memory addresses of the host memory to memory addresses of the memory available to the virtual machine(s) 170. Accordingly, address translation may be handled using the page table(s), which store a mapping of virtual addresses to physical addresses.

For example, the physical memory associated with a virtual machine 170 or its associated applications may be divided into pages. The memory pages may be identified with a unique number (e.g., Page Frame Number). The page table may also comprises page entries that map Page Frame Number(s) ("PFN") with an address. The page table(s) may be used together with any paging data structure to support translation between addresses (e.g., 32-bit linear address space using a two-level hierarchical paging structure, Physical Address Extension mode, INTEL Extended Memory 64 Technology mode, etc.).

Then, the method includes detecting a request to restart a host (block 320). For example, the hypervisor 180 may detect a request to restart a host (e.g., host OS 186). The host may request to restart when performing an in-place software upgrade. For example, instead of live migrating the virtual machine(s) 170 to a new host, the host may be updated or upgraded in-place without migrating the associated virtual machines 170 to the new host. Specifically, live migration of a virtual machine 170 may be time consuming and computationally expensive, which is especially problematic if the host needs to be upgraded frequently or if the host needs to be upgraded and restarted quickly. Additionally, method 300 includes synchronizing the virtual machine memory (block 330). For example, the hypervisor 180 may synchronize the virtual machine memory 195 by copying data to the persistent storage 125 for each page of the virtual machine memory 195 that has changed. Specifically, the hypervisor 180 may synchronize the virtual machine memory 195 to copy over any data that has changed since the mapping at block 310. The hypervisor 180 may be configured to iterate over the virtual machine memory when synchronizing the virtual machine memory 195. As discussed above, the hypervisor 180 may iterate over the virtual machine memory 195 by reviewing log 220 or in page-cache for a changed flag 204.

Method 300 also includes pausing the virtual machine (block 340). For example, prior to the host restarting, the hypervisor 180 may pause the virtual machine 170. Specifically, the hypervisor 180 may initiate a stop, suspend or pause operation such that the virtual machine is "stopped", "suspended", or "paused." Then, method 300 includes saving a virtual machine state to the persistent storage (block 350). For example, the hypervisor 180 may save the VM state 230 to the persistent storage 125. The VM state 230 may be saved prior to pausing the virtual machine 170, while pausing the virtual machine 170, or after pausing the virtual machine 170.

Additionally, method 300 includes restoring the virtual machine state (block 360). For example, after the host restarts, the hypervisor 180 may restore the VM state 230. The VM state 230 may be restored by loading the previously saved VM state 230 into the virtual machine 170 or copying the previously saved VM state 230 from persistent storage 125 to the virtual machine 170. Then, method 300 includes resuming the virtual machine (block 370). For example, the hypervisor 180 may resume operation of the virtual machine 170. After resuming operation of the virtual machine 170, the hypervisor 180 may again synchronize the virtual machine memory 195 by restoring the virtual machine memory 195 associated with the virtual machine 170. Restoring the virtual machine memory 195 may include copying data from the persistent storage 125 to the virtual machine memory 195 (e.g., RAM) as the virtual machine 170 accesses each page of virtual machine memory 195.

By synchronizing virtual machine memory 195 (e.g., RAM) with the persistent storage 125 (e.g., disk), the hypervisor 180 advantageously supports persistence functionality and allows host upgrades without the need for special hardware (e.g., a separate persistent memory card with its own power source). Additionally, the host may be upgraded without restarting the virtual machine or performing a time consuming and resource-expensive live migration, which ultimately improves uptime for virtual machines 170. Additionally, the method(s) described herein advantageously allows for upgrading the entire stack or the full stack from the kernel on upwards including upgrading quick emulators ("QEMUs") and libraries, whereas a local host migration only allows upgrading QEMUs while the system is stuck with an outdated kernel and other outdated supporting components and libraries.

Figure 4B:
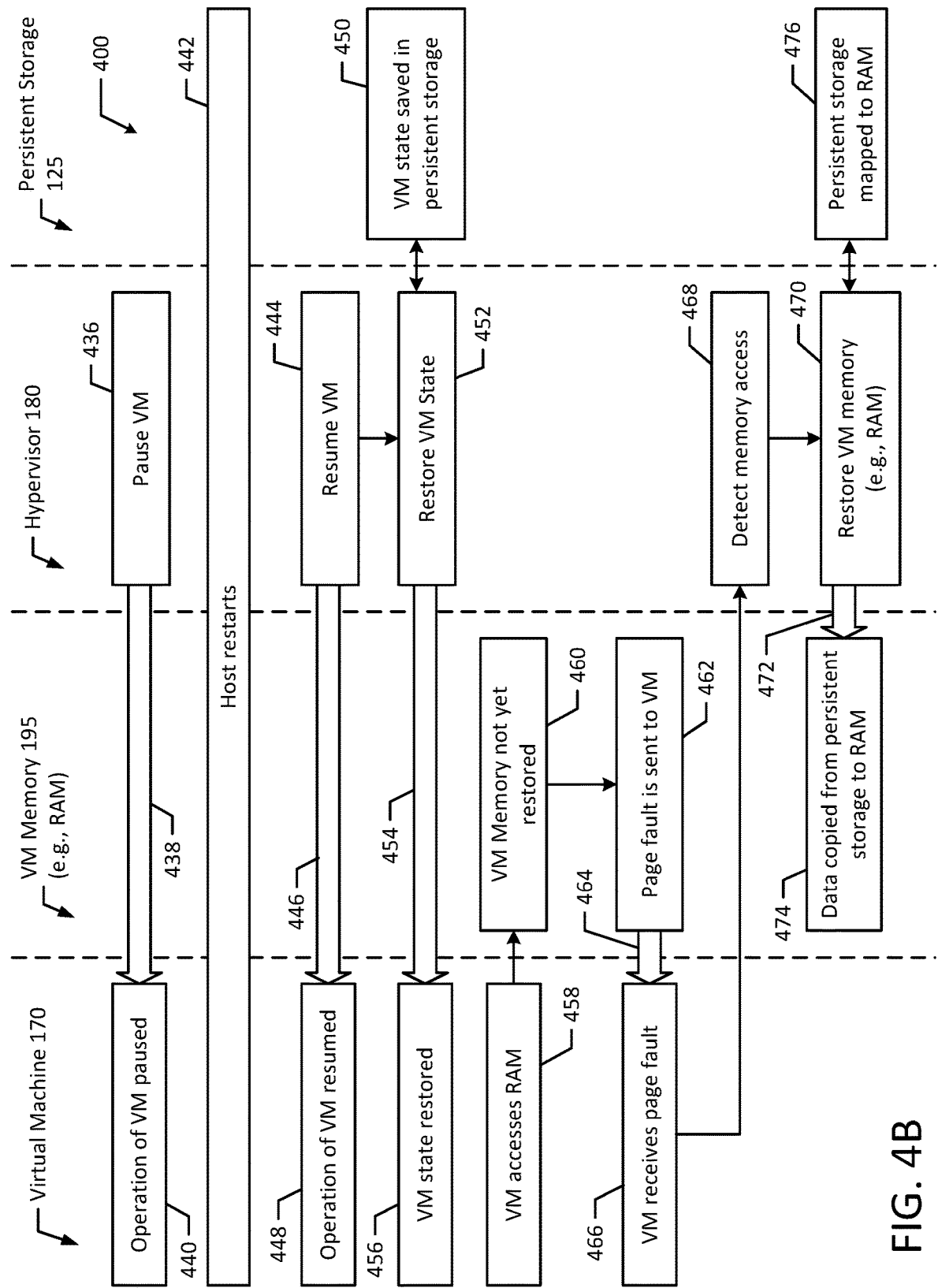

FIGS. 4A and 4B depict a flow diagram illustrating an example method 400 for resuming operation of a virtual machine 170 after a host restart according to an example embodiment of the present disclosure. Although the example method 400 is described with reference to the flow diagram illustrated in FIGS. 4A and 4B, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both. For example, a hypervisor 180 may communicate with a virtual machine 170, the virtual machine memory 195 and persistent storage 125 to perform example method 400.

In the illustrated example, a virtual machine 170 has associated virtual machine memory 195. The virtual machine memory 195 (e.g., RAM) has memory pages with associated data (block 402). The hypervisor 180 maps the virtual machine memory 195 (e.g., RAM) to persistent storage 125 (block 404). For example, the mapping 406 between virtual machine memory 195 (e.g., RAM) and persistent storage (e.g., disk) may be achieved with a page table. Then, the virtual machine memory 195 (e.g., RAM) is mapped to the persistent storage 125 (block 408).

During operation, the virtual machine 170 writes new data 412 to the virtual machine memory 195 (e.g., RAM) (block 410). For example, the virtual machine 170 or an application 198 running within the virtual machine 170 may retrieve data 412 from one memory location and write the data 412 to its mapped memory (e.g., RAM). The write operation may be performed while the virtual machine 170 (or application 198) is executing routine tasks. Then, the virtual machine memory 195 (e.g., RAM) is changed with the new data 412 (block 414). For example, the virtual machine memory 195 may have at least one memory page that differs from the memory that was previously mapped or copied to persistent storage 125.

Then, the host requests to restart (block 416). At some point, a host may need to restart, for example for a software upgrade, such as an in-place software upgrade. For example, the host may perform an in-place software upgrade to upgrade the entire stack including running QEMUs. The hypervisor 180 detects the host's request to restart (block 418). After detecting the host's request to restart, the hypervisor 180 synchronizes virtual machine memory (e.g., RAM) (block 420). For example, the hypervisor 180 may determine a respective status for each memory page of the virtual machine memory 195 as (i) the same as an existing page in the persistent storage 125 or (ii) different from each existing page in the persistent storage 125. One way to determine if a memory page has changed is by checking whether a flag 204 (e.g., a "dirty" flag) exists for each memory page in page-cache or within a log 220.

Once to changed memory pages or new data is identified by the hypervisor 180, the hypervisor 180 copies the new data 424 in virtual machine memory 195 (e.g., RAM) to persistent storage (block 422). The new data 424 may be the same data 412 that was written into the RAM by the virtual machine 170 at block 410. Then, the new data 424 in the virtual machine memory 195 (e.g., RAM) is copied to persistent storage (block 426). The new data 424 may be copied over to the previously mapped memory page. In another example, the entire memory page may be replaced in the persistent storage 125.

As the virtual machine is running, the virtual machine 170 operates with a VM state (block 428). For example, the VM state may include an identifier associated with the VM or the underlying hardware (e.g., a hardware ID, a firmware ID, a vendor ID), version information associated with the VM or underlying hardware, a list of running applications or loaded firmware, information regarding memory size or memory allocated to the virtual machine 170, or a hash function of any such information. Additionally, the VM state 230 may include status information of the virtual machine 170 such as "starting", "running", "stopping", "stopped", "suspended", "paused", "aborted", "stuck", etc. The hypervisor 180 may save the VM state 432 to persistent storage 125 (block 430). Then, the VM state 432 is saved to persistent storage (block 434). Saving the VM state 432 to persistent storage 125 may automatically be initiated upon detecting a host request to restart or while synchronizing virtual machine memory 195.

Continuing on FIG. 4B, the hypervisor 180 pauses the virtual machine 170 (block 436). For example, the hypervisor 180 may send a pause instruction 438 to the virtual machine 170. Then, the operation of the virtual machine 170 is paused (block 440). Specifically, the hypervisor 180 may initiate a stop, suspend or pause operation such that the virtual machine is "stopped", "suspended", or "paused." After the virtual machine 170 is paused, the host may restart (block 442). For example, the host may perform its upgrade and restart after upgrading.

After the host restarts, the hypervisor 180 resumes the virtual machine 170 (block 444). For example, the hypervisor 180 may send a resume instruction 446 to the virtual machine 170. Then, the operation of the virtual machine 170 is resumed (block 448). Specifically, the hypervisor 180 may initiate a resume, run, or start operation such that the virtual machine is "starting" or "running."

As illustrated in FIG. 4A at block 434 and illustrated again in FIG. 4B, the VM state is saved in persistent storage 125 (block 450). After resuming operation of the virtual machine 170, the hypervisor 180 may restore the VM state 454 (block 452). For example, the hypervisor 180 may load the previously saved VM state, such that when the virtual machine 170 resumes, it resumes operation with the same state it had prior to being paused. Then, the VM state 454 is restored (block 456).

As illustrated in FIG. 4B, the virtual machine 170 may attempt to access virtual machine memory 195 (e.g., RAM) (block 458). However, the virtual machine memory 195 has not yet been restored (block 460). A page fault 464 is sent to the virtual machine 170 (block 462). For example, the virtual machine memory 195 was previously copied to persistent storage 125, however the virtual machine memory 195 may not have persisted beyond the host restart. Then, the virtual machine 170 receives the page fault 464 (block 466). The hypervisor 180 detects the memory access attempt (block 468). For example, the hypervisor 180 may detect the page fault 464. In another example, the virtual machine 170 may notify the hypervisor 180 after receiving the page fault 464.

Then, the hypervisor 180 restores virtual machine memory 195 (e.g., RAM) (block 470). For example, the hypervisor 180 may copy data 472 from persistent storage 125 to the virtual machine memory 195. The data 472 may be copied on a page by page basis. For example, the hypervisor 180 may copy each memory page as page faults or memory access attempts are detected. Then, the data 472 is copied from persistent storage to the virtual machine memory 195 (e.g., RAM) (block 474). Eventually, all of the persistent storage 125 is mapped to the virtual machine memory 195 (e.g., RAM) (block 476). Restoring the virtual machine memory 195 in this way, which may be referred to as lazily restoring the memory, may advantageously spread out memory restoration into smaller pieces and increments. For example, restoring the entire virtual machine memory 195 in a single operation may be time consuming and computationally expensive to read a large memory image. When a large fraction of system time is spent restoring memory, the system may experience degraded performance and may essentially become unusable during that time.

Figure 5:
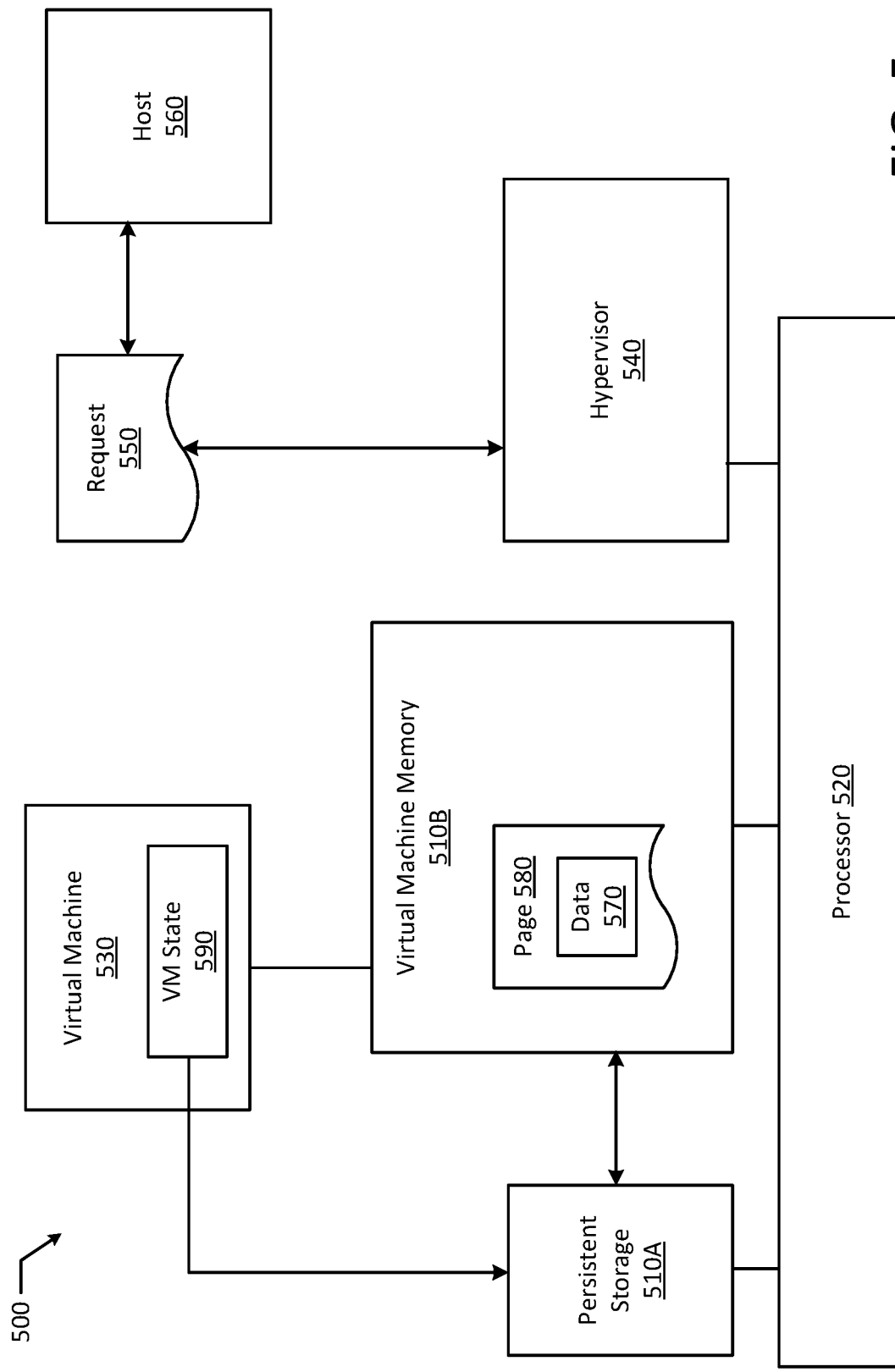
FIG. 5 illustrates a block diagram of an example synchronization system according to an example embodiment of the present disclosure.

FIG. 5 is a block diagram of an example synchronization system 500 according to an example embodiment of the present disclosure. The system 500 includes at least one memory 510A-B including a persistent storage 510A. The system also includes at least one processor 520 in communication with the at least one memory 510A-B. Additionally, the system 500 includes a virtual machine 530 associated with a virtual machine memory 510B and a hypervisor 540 executing on the at least one processor 520.

The hypervisor 540 is configured to map the virtual machine memory 510B to the persistent storage 510A, detect a request 550 to restart a host 560, and synchronize the virtual machine memory 510B by copying data 570 to the persistent storage 510A for each page 580 of the virtual machine memory 510B that has changed. The hypervisor 540 is also configured to pause the virtual machine 530 prior to the host 560 restarting. Additionally, the hypervisor 540 is configured to save a virtual machine state 590 to the persistent storage 510A, restore the virtual machine state 590 after the host 560 restarts, and resume operation of the virtual machine 530.

By synchronizing the virtual machine memory 510B with the persistent storage 510A, the hypervisor 540 advantageously supports persistence functionality and allows host 560 upgrades without the need for special hardware (e.g., a separate persistent memory card with its own power source such that the virtual machine 530 is not restarted as the host 560 restarts or even crashes). Additionally, the host 560 may be upgraded without restarting the virtual machine 530 and without having to performing a time consuming live migration, which may be computationally expensive. Specifically, the system 500 improves uptime for virtual machines 530 by pausing the virtual machine 530 and restoring the virtual machine state 590 after the host 560 restarts.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
at least one memory including a persistent storage;
at least one processor in communication with the at least one memory;
a virtual machine associated with a virtual machine memory; and
a hypervisor executing on the at least one processor, wherein the hypervisor is configured to:
map the virtual machine memory to the persistent storage prior to a restart of a host,
detect a request to restart the host as part of an upgrade to the host after an initial mapping between the virtual machine memory and the persistent storage,
in response to detecting the request to restart the host, synchronize the virtual machine memory by checking a flag for each page of the virtual machine memory that has changed after the initial mapping between the virtual machine memory and the persistent storage, and copying data to the persistent storage for each page of the virtual machine memory that has changed based at least upon the flag,
pause the virtual machine prior to the host restarting without stopping the virtual machine,
save a virtual machine state to the persistent storage subsequent to the virtual machine being paused,
restore the virtual machine state after the host restarts to upgrade the host, and
resume operation of the virtual machine in response to restoring the virtual machine state.

2. The system of claim 1, wherein respective flags are stored in a log.

3. The system of claim 2, wherein the hypervisor is configured to iterate over the virtual machine memory when synchronizing the virtual machine memory.

4. The system of claim 3, wherein the hypervisor iterates over the virtual machine memory by reviewing the log.

5. The system of claim 1, wherein the hypervisor is further configured to synchronize the virtual machine memory by restoring the virtual machine memory associated with the virtual machine after resuming operation of the virtual machine.

6. The system of claim 5, wherein the hypervisor is configured to restore the virtual machine memory by copying data from the persistent storage to RAM as the virtual machine accesses each page of virtual machine memory.

7. The system of claim 1, wherein the persistent storage is disk storage.

8. The system of claim 1, wherein the persistent storage is configured to persist across at least one of a power cycle and a power failure.

9. The system of claim 8, wherein the persistent storage is configured to persist without a battery.

10. The system of claim 1, wherein the persistent storage is configured to persist post-restart of the host.

11. A method comprising:
mapping, by a hypervisor, a virtual machine memory associated with a virtual machine to a persistent storage prior to a restart of a host;
detecting, by the hypervisor, a request to restart the host as part of an upgrade to the host after an initial mapping between the virtual machine memory and the persistent storage;
in response to detecting the request to restart the host, synchronizing, by the hypervisor, the virtual machine memory by checking a flag for each page of the virtual machine memory that has changed after the initial mapping between the virtual machine memory and the persistent storage, and copying data to the persistent storage for each page of the virtual machine memory that has changed based at least upon the flag;

prior to the host restarting, pausing, by the hypervisor, the virtual machine without stopping the virtual machine;

saving, by the hypervisor, a virtual machine state to the persistent storage subsequent to the virtual machine being paused;

after the host restarts to upgrade the host, restoring, by the hypervisor, the virtual machine state; and resuming, by the hypervisor, operation of the virtual machine in response to restoring the virtual machine state.

12. The method of claim 11, wherein respective flags are stored in a log.

13. The method of claim 12, wherein synchronizing the virtual machine memory includes iterating over the virtual machine memory.

14. The method of claim 13, wherein iterating over the virtual machine memory includes reviewing, by the hypervisor, the log.

15. The method of claim 11, further comprising synchronizing, by the hypervisor, the virtual machine memory by restoring the virtual machine memory associated with the virtual machine after resuming operation of the virtual machine.

16. The method of claim 15, wherein restoring the virtual machine memory includes copying data from the persistent storage to RAM as the virtual machine accesses each page of virtual machine memory.

17. The method of claim 11, wherein the persistent storage is disk storage.

18. The method of claim 11, wherein the persistent storage persists across at least one of a power cycle and a power failure.

19. The method of claim 11, wherein copying data to the persistent storage for each page of the virtual machine memory that has changed includes determining a respective status for each page as one of (i) the same as an existing page in the persistent storage and (ii) different from each existing page in the persistent storage.

20. A non-transitory machine readable medium storing code, which when executed by at least one processor is configured to:

map a virtual machine memory associated with a virtual machine to a persistent storage prior to a restart of a host;

detect a request to restart the host as part of an upgrade to the host after an initial mapping between the virtual machine memory and the persistent storage;

in response to detecting the request to restart the host, synchronize the virtual machine memory by checking a flag for each page of the virtual machine memory that has changed after the initial mapping between the virtual machine memory and the persistent storage, and copying data to the persistent storage for each page of the virtual machine memory that has changed based at least upon the flag;

pause the virtual machine prior to the host restarting without stopping the virtual machine;

save a virtual machine state to the persistent storage subsequent to the virtual machine being paused;

restore the virtual machine state after the host restarts to upgrade the host; and resume operation of the virtual machine in response to restoring the virtual machine state.

* * * * *